United States Patent [19]

Barnes, Jr. et al.

[11] 4,292,206

[45] Sep. 29, 1981

[54] USE OF HOLLOW GLASS SPHERES IN CONJUNCTION WITH REHYDRATABLE ALUMINA FOR MAKING LOW DENSITY CATALYST SUPPORT BEADS

[75] Inventors: Robert E. Barnes, Jr., Sandy Hook; Venkatrao Pai, Stamford, both of Conn.

[73] Assignee: American Cyanamid Company, Stamford, Conn.

[21] Appl. No.: 180,559

[22] Filed: Aug. 22, 1980

[51] Int. Cl.$^3$ .......................... B01J 21/04; B01J 35/08
[52] U.S. Cl. .................................... 252/463; 252/448; 252/477 R
[58] Field of Search .................. 252/448, 463, 477 R; 423/628

[56] References Cited

U.S. PATENT DOCUMENTS 3,923,688  12/1975  Hammel et al. ............... 252/454 X
4,179,408  12/1979  Sanchez et al. ..................... 252/448

Primary Examiner—Wm. J. Shine
Attorney, Agent, or Firm—Gordon L. Hart

[57] ABSTRACT

For making low density alumina or silica-alumina beads as catalyst support particles for auto-exhaust catalysts, hollow glass spheres of very small diameter are incorporated in the alumina powder mix before it is formed into beads and calcined. The beads may be finished with a surface coat of alumina without the microspheres to improve resistance to abrasion. Preferred beads are made with rehydratable alumina powder.

5 Claims, No Drawings

USE OF HOLLOW GLASS SPHERES IN CONJUNCTION WITH REHYDRATABLE ALUMINA FOR MAKING LOW DENSITY CATALYST SUPPORT BEADS

The invention relates to catalyst support particles having low density and controlled macroporosity. These particles are useful in several applications and particularly as granular supports for catalysts used in catalytic conversion of auto exhaust emissions.

Low density catalyst supports of alumina or silica alumina or the like have been made by incorporating combustible fillers such as wood flour, combustible resin powder and the like in the pre-extrusion mixture for making extruded support particles, extruding the mixture through dies and then drying and calcining the extruded particles. In the calcining process the combustible fillers would burn out leaving macropores in the calcined alumina particle.

According to the present invention, instead of using a combustible filler, we mix tiny hollow glass spheres, i.e. glass bubbles, in the alumina powder that is to be used for forming the catalyst support particles and, instead of extruding the mixture, we form the mix into spherical particles by pan granulation. It has so far been impractical to extrude mixtures containing the glass bubbles because the pressure generated by the extrusion process causes the glass bubbles to collapse. Pan granulation forms the powder into spherical particles without excessive pressure so the spherical alumina particles emerge with the glass bubbles intact, incorporated uniformly in the formed support particles. On calcining of the spherical alumina particles at temperatures from about 1100° to about 1800° F. many of the glass bubbles fuse or burst leaving tiny voids throughout the alumina spherical particle in place of the glass bubbles.

Hollow glass spheres are available commercially in a variety of grades and sizes from 3M Company, St. Paul, Minnesota and from Emerson and Cuming, Inc. For making spherical alumina supports for auto exhaust catalyst as described in the examples below, we have selected the Emerson and Cuming Microballoon FTD 202 and the 3M Glass Bubbles type C15/250. Other types and sizes of hollow glass spheres having mean diameters in the range from about 50 to about 175 microns may be used in accordance with the invention. Suitable hollow glass spheres for the use may be selected from those made with various glass or ceramic compositions to suit a particular intended use.

The spherical alumina supports may be of any selected alumina or silica alumina powder, or the like, having composition suitable for the use intended. For making the catalyst supports described in the examples, the preferred alumina powder composition is a partly dehydrated alumina powder prepared by flash calcining alumina hydrate. The powder is formed into spherical particles of any suitable diameter up to about ¼ inch which are then processed to rehydrate the alumina and then calcined to finish the support particle.

In the use of the spherical alumina support particles for auto exhaust catalyst, catalytic metals and promoters are placed on the supports by conventional solution impregnation procedures.

The invention is described in more detail with specific reference to certain preferred embodiments in the following examples.

EXAMPLE 1

The process begins by blending from 0.1 to 15 percent by wt., preferably 0.5 to 5 percent by wt., of the selected hollow glass spheres with a rehydratable hemihydrate alumina powder of 5 micron to 15 micron mean particle size. For this example the spheres constitute 5% by wt. of the blended powder and are of the Emerson & Cuming type FTD-202 "Microballoons".

A 14 inch diameter Dravo pan granulator fitted with one spray nozzle is adjusted to a tilt approximately 35° off horizontal. (For a 3 foot diameter pan a 48° tilt would be used). The pan is rotated clockwise. In its upper right quadrant, the pan is fitted with four plows set across the radius of the pan with each plow about ¼ and ⅜ inch above the surface of the pan. These plows will distribute the bed build-up and will aid mixing of the pan contents as the pan rotates. To start the pan granulation, the pan surface is lightly sprayed with water and the blended powder is fed by hand as the pan rotates. Spraying and powder addition by hand are continued until the bed build-up reaches the base of the plows. Then the powder feed is set just below the plows near the periphery of the pan and the water spray is set at the lower right quadrant below the powder feed. The rotational speed of the pan is adjusted to achieve the desired bead forming action. A speed about 25 RPM is suggested for the 14 inch pan. Too slow speed gives poor classification; excessive speed forces all of the material to the wall of the pan and thus inhibits the balling action which forms the spherical particles. The water content is regulated by adjustment of the spray. The highest workable quantity of water is preferred. A water content in the product to give 38 to 42 percent weight loss on ignition is ideal (LOI at 1800° F. for one hour). As beads of the blender powder begin to build-up to about ⅛ inch diameter in the lower left quadrant, they are removed from the pan and placed in a steaming oven at 100°+to cure for about two hours. The steaming period may be varied from 15 minutes to 16 hours and may be carried out in several stages at varied temperature. After steaming, the beads are soaked in aqueous acetic acid (or dilute nitric acid) solution (1% acid on wt. of alumina) at 90° C. for about 30 minutes followed by four 30-minute soakings in hot deionized water. This washing step reduces the sodium content of the beads. The wet beads are dried at 125° C. for two hours, sorted to size as desired, in this example 5 to 8 mesh, and then are calcined at 1800° F. for one hour. The Crush Strength of the finished bead is 6 lbs; Compacted Bulk Density (CBD) is 0.462 g/cc and the $N_2$ surface area is 92.6 meter$^2$/gm.

EXAMPLE 2

Using a different hollow glass sphere, 3M type C15/250 at only 0.5% by wt. in the alumina powder blend, and using the process described by Example 1, a product having unusually high LOI of 44.4% is obtained. The use of hollow glass spheres appears to improve wetting of the alumina in the pan granulator.

EXAMPLE 3

The process of Example 1 is followed, using 5% by wt. of 3M Type C15/250 beads, except when the granulation reaches a stage of intermediate size spheres, the powder feed is changed to only alumina powder and the further granulation to full size is continued with this feed. This produces a bead with a low-density porous core and a coating of the denser pure alumina, having crush strength 6.3 lbs; CBD 0.538 gm/cc. Because of the denser outer coating this bead will have better resistance to attrition by impact and friction in a catalyst bed.

The beads produced in the foregoing examples are especially suited for use as particulate supports for the catalytic metals that are useful for internal combustion engine exhaust emission control, of the kind used in catalytic conversion reactors in auto exhaust systems.

The further preparation of the catalyst by imbibing the spherical alumina supports with platinum, palladium and rhodium salt solutions followed by drying and calcining is well known and need not be described here.

The alumina spherical particles of the invention will also be useful in other applications where low density alumina beads of controlled macroporosity are needed.

We claim:

1. Spherical alumina particles having macroporous structure prepared by forming a mixture of alumina powder and hollow glass spheres with water into wet spherical beads of said mixture, drying the beads and calcining the dried beads.

2. Spherical alumina particles defined by claim 1 wherein the wet spherical beads are formed on a pan granulator.

3. Spherical alumina particles defined by claim 1 wherein the alumina powder is rehydratable alumina hemihydrate and the wet spherical beads are cured by steaming before they are dried and calcined.

4. Spherical alumina particles defined by claim 1 wherein the mixture comprises about 0.5 to 5% by wt. based on the alumina weight of hollow glass spheres of mean diameter in the range from 50 to 175 microns.

5. Auto exhaust catalyst comprising spherical alumina support particles defined by claim 1 with catalytic metals deposited thereon.

* * * * *